United States Patent [19]

Petri

[11] Patent Number: 4,788,273

[45] Date of Patent: Nov. 29, 1988

[54] BRANCHED POLYCARBONATES CONTAINING TETRACARBOXYFUNCTIONAL HETEROCYCLIC COMPOUNDS AND PROCESS FOR THEIR PREPARATION

[75] Inventor: Alberto Petri, Milan, Italy

[73] Assignee: Enichem Tecnoresine, S.p.A., Milan, Italy

[21] Appl. No.: 74,554

[22] Filed: Jul. 17, 1987

[30] Foreign Application Priority Data

Jul. 23, 1986 [IT] Italy ............................... 21231 A/86

[51] Int. Cl.[4] ............................................ C08G 63/62
[52] U.S. Cl. ..................................... 528/176; 528/179; 528/192; 528/196
[58] Field of Search ......................... 528/176, 192, 179

[56] References Cited

U.S. PATENT DOCUMENTS 4,294,953 10/1981 Quinn et al. ......................... 528/176

Primary Examiner—Harold D. Anderson
Attorney, Agent, or Firm—Hedman, Gibson, Costigan & Hoare

[57] ABSTRACT

Branched, thermoplastic polycarbonates, suitable for being processed by means of the blow-moulding technique, are prepared by means of copolymerization with tetrafunctional heterocyclic compounds.

17 Claims, No Drawings

BRANCHED POLYCARBONATES CONTAINING TETRACARBOXYFUNCTIONAL HETEROCYCLIC COMPOUNDS AND PROCESS FOR THEIR PREPARATION

The present invention relates to branched, thermoplastic, polycarbonates, suitable for being transformed by means of the blow-moulding technique (blow moulding of hollow bodies).

Linear polycarbonates have been long known in the art.

Such polymers are widely used in different applicative sectors, but, contrarily to most thermoplastic polymers, they are not suitable for being processed by means of extrusion or blow-moulding techniques, which are the techniques suitable for supplying particular transformation products (cellular sheets, bottles, hollow containers, and so forth).

This difficulty in processability of linear polycarbonate is due to its exclusively Newtonian behaviour, according to which the apparent viscosity ($\eta$) is substantially independent from the shear rate ($\gamma$).

The transformation of a material according to the techniques of extrusion or of blow-moulding requires, on the contrary, that it has a decreasing apparent viscosity with increasing shear rate, a typical aspect of non-Newtonian behaviour, so that the state of the molten polymer can be differentiated into two successive moments: a first moment, when it is inside the transformation machine (e.g., an extruder), and a second moment, when the product leaves it (e.g., from the die of the same extruder).

In the first step, the shear rates the fluid is subject to, are high, and its apparent viscosity is, vice-versa, low, so that the processability thereof results facilitaed; when the fluid leaves the extruder, on the contrary, low values of $\gamma$, and high viscosity values appear, and this prevents the product from collapsing, and makes it possible a good dimensional stability of the manufactured article to be achieved.

The non-Newtonian behaviour of the molten polymer has a considerable influence on two properties, i.e., the melt elasticity, or pseudo-elasticity, and the melt strength, thereof, which are equally very important for the transformation techniques of extrusion and blow-moulding.

The melt elasticity consists essentially in the capability of the non-Newtonian fluid of swelling to a greater extent, when exiting the die, than a Newtonian fluid, as a consequence of a higher recovery of elastic energy inside its interior, thanks to a greater molecular deflection and orientation under the action of a shear stress.

That results in an increase in the processability of the product, due to the effect of a greater flexibility and ductility of the material.

The second property indicated, viz., the melt tenacity, becomes vica-versa meaningful when the molten polymer exits the transformation machine. It can be considered as the tenacity of the polymer in the molten state, i.e., the stress-supporting capacity shown by the polymer. If, in fact, the molten mass is not capable of supporting its own weight, the collapse occurs of the extrudate, and, as a consequence, obtaining the desired shape of the manufactured article is not possible.

It results evident from the above that the polymers which display a non-Newtonian behaviour are endowed with two basic characteristics, which enable them to be transformed by extrusion and/or blow-moulding techniques: a very easy processability inside the machine (low apparent viscosity for high values of $\gamma$ and high melt elasticity), and very good shape retention when exiting said machine (high apparent viscosity for low values of $\gamma$ and considerable melt tenacity).

In the art, branched polycarbonates are known, which have non-Newtonian rheological properties, suitable for being processed according to techniques of extrusion and of blow-moulding.

Such polycarbonates can be obtained by means of the copolymerization with polyfunctional comonomers containing three or more —OH and/or —COOH and/or —COCl groups.

The main technical problems which can be met in the preparation of the branched polycarbonates consist essentially in the reactivity of the polyfunctional comonomer used, and in the characteristics of the branched polycarbonate obtained with such a comonomer.

In particular, the comonomer should show a so high reactivity, as to make it possible to achieve the desired branching degree (such to give the polymer a shear-sensitivity $>15$), when used in small amounts.

The branched polycarbonate, besides showing a shear sensitivity $>15$, should maintain unchanged the other characteristics which are typical of the linear polycarbonates.

The polyfunctional comonomers of the prior art have not shown to be completely satisfactory from all of these viewpoints.

It has been found now that it is possible to overcome the drawbacks deriving from the prior art, and obtain branched, thermoplastic, polycarbonates, suitable for being transformed by blow-moulding, by copolymerization with a polyfunctional, highly reactive, comonomer, used in small amounts.

Such polycarbonates, thanks to the branchings due to the presence of the polyfunctional comonomer in the macromolecule, show a sheer-sensitivity (which is the ratio between the flow rates of the molten polymer at two different shear rates) $>15$, while maintaining unchanged the other characteristics typical of the linear polycarbonates.

Therefore, a purpose of the present invention are branched, thermoplastic polycarbonates, suitable for being transformed by blow-moulding.

Another purpose of the present invention is a process for the preparation of said polycarbonates.

In particular, according to the present invention, such branched polycarbonates are characterized in that they have in their macromolecule units deriving from tetrafunctional heterocyclic compounds having the formula:

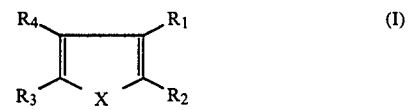

wherein $R_1$, $R_2$, $R_3$ and $R_4$ are equal to, or different from each other, and represent —COOH or COCl;

$X = O, S$.

or the corresponding saturated compounds.

The branched polycarbonates disclosed in the present invention can be prepared by means of a process comprising the following process steps, carried out successively:

(a) Preparation of a chloroformyl-capped oligomer, by reaction between phosgene and a dihydroxyaromatic compound, corresponding to the formula:

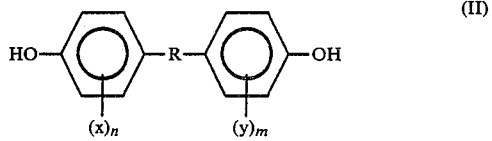

wherein:
R—substituted or unsubstituted alkyl radical, containing from 0 to 5C, —O—, —S— atoms, —SO$_2$—, —CO— groups;
x, y are equal to or different from each other, and represent H, CH$_3$, halogens;
m, n are integers, equal to, or different from, each other, comprised within the range of from 1 to 4.

(b) Condensation of the so-obtained oligomer with the polyfunctional comonomer corresponding to the formula (I), wherein R$_1$, R$_2$, R$_3$, R$_4$, X have the above seen meaning.

(c) Addition of a dihydroxyaromatic compound (II) to the mixture deriving from (b), and polycondensation.

(d) Recovery of the branched polycarbonate from the reaction mixture.

According to the present invention, the chloroformyl-capped oligomers are prepared by means of the interfacial reaction between phosgene and a dihydroxyaromatic compound (II) dissolved in aqueous-alkaline solution, in the presence of an organic solvent immiscible with water and of a molecular weight regulator, such as, e.g., p-tert.butyl-phenol or p-isopropyl-phenol.

As dihydroxyaromatic compounds, e.g., the following can be used:
4,4'-dihydroxydiphenyl;
2,2-bis(4-hydroxyphenyl)propene (bisphenol A);
2,2-bis(3,5-dichloro-4-hydroxyphenyl)propane;
bis(4-hydroxyphenyl)methane;
2,2-bis(3,5-dimethyl-4-hydroxyphenyl)propane.

Also bivalent compounds with one aromatic ring only can be used, such as resorcinol, hydroquinone and pyrocatechol.

The process is carried out at a temperature comprised within the range of from 15° C. to 35° C., and, preferably, at room temperature (20°–25° C.).

The so obtained oligomers have a molecular weight of from 400 to 2000.

After the separation of the two phases, to the organic phase, containing the chloroformyl-capped oligomers, the polyfunctional comonomer (I), dissolved in an organic solvent immiscible with water, preferably methylene chloride, is added, so to obtain in the end polycarbonate from 0.05 to 5 mol of comonomer per each 100 mol of aromatic dihydroxy-compound.

Some examples of polyfunctional comonomers used are:
2,3,4,5-furan-tetracarboxylic acid;
2,3,4,5-thiophene-tetracarboxylic acid;
2,3,4,5-tetrachlorocarbonylfuran;
2,3,4,5-tetrahydrofuran-tetracarboxylic acid;
2,3,4,5-tetrachlorocarbonyl-tetrahydrofuran.

An aqueous-alkaline solution is then added, which contains a reducing agent, preferably sodium dithionite, for the purpose of preventing the formation of coloured byproducts, and an aqueous solution is added, which contains the phase-transfer catalyst, e.g., a tertiary amine, preferably triethylamine.

The temperature at which the condensation is carried out ranges from 15° C. to 35° C. and is preferably kept around room values (20–25° C.).

After a time period ranging from 30 to 60 minutes preferably 40 minutes, the biphasic system coming from the condensation with the polyfunctional comonomer is treated with an alkaline solution of the aromatic dihydroxy-derivative.

An aqueous-alkaline solution of sodium hydroxide at 40% by weight is then added.

After a time period of from 2 to 3 hours, the so obtained branched polycarbonate is isolated by washing the organic phase according to the methods of the known art, the distillation of the solvent, or precipitation by means of a non-solvent.

The preparation of such branched polycarbonates can be carried out also by means of other processes, such as, e.g., the process which provides the condensation between aromatic dihydroxy-derivatives, phosgene and polyfunctional comonomer, by means of an interfacial reaction, or of a reaction in solution, in one single reaction step.

Such polycarbonates can be also obtained by transesterification in the molten state, by reacting the dihydroxyaromatic compound with diaryl-, dialkyl- or alkylaryl-carbonates at temperatures of from 100° to 300° C., in the presence of transesterification catalysts.

The branched polycarbonates of the present invention have a molecular weight ranging from 20,000 to 30,000, and are characterized in that they are completely soluble in the usual solvents of the linear polycarbonate, and show a high dependence of the melt viscosity from the shear rate.

Such polycarbonates are hence well suitable for being processed both by the injection-moulding technique, typical of the linear polycarbonates, and by, e.g., extrusion.

Due to the excellent stability of the molten mass, such polycarbonates are particularly well suitable for being transformed by the blow-moulding method, for the production of hollow bodies.

The reactivity of the polyfunctional comonomer used as the branching agents is such that an amount of from 0.05 to 5 mol of such comonomer per each 100 mol of aromatic dihydroxy-compound are enough for reaching such a crosslinking degree that the shear-sensitivity has values always higher than 15.

For the characterization of the branched polycarbonates according to the present invention, the following methods were used:
Intrinsic Viscosity—the intrinsic viscosity is determining in methylene chloride at 20° C. by means of an Ubbelhode viscometer and is expressed as dl/g.
Shear Sensitivity—the evaluation of this quantity is carried out on the melt-indexer, under loads of from 2.16 to 21.6 kg, at 260° C., according to ASTM D 1238.
Impact resistance (120D)—The impact resistance is measured on specimens with notch, at 0° C., according to ASTM D 256.

The following examples are illustrative and not limitative of the same invention.

EXAMPLE 1

Preparation of 2,3,4,5-Tetrachlorocarbonyl-tetrahydrofuran

To a flask of 250 ml of capacity, 20.0 g (80 mmol) of 2,3,4,5-tetrahydrofurantetracarboxylic acid, 33.3 g (160 mmol) of phosphorus pentachloride and 200 ml of thionyl chloride are charged: the mixture is refluxed, with stirring, 32 hours long.

The reaction kinetics can be monitored by I.R. spectroscopy, by observing the disappearance of the wide absorption band at $\bar{v}=1{,}700{:}1{,}220$ cm$^{-1}$, and the contextual appearance of another band at $\bar{v}=1{,}760{:}1{,}790$ cm$^{-1}$.

When the reaction has subsided, the thionyl chloride is distilled off under room pressure (boiling temperature=79° C.), and the product is recovered by an analogous operation of distillation, under vacuum (boiling point=119° C. under 0.05 mm$_{Hg}$).

The yield is of about 20%.

Elemental Analysis: C=29.8%; H=1.4%; Cl=41.2%. (C$_8$H$_4$O$_5$Cl$_4$ requires: C=28.8%; H=1.3%; Cl=44.1%

The equivalent weight and molecular weight values (chloride titration) comply with the proposed formula.

The other unsaturated and saturated tetrafunctional heterocyclic derivatives corresponding to formula (I) are prepared by modalities analogous to those as above disclosed.

EXAMPLE 2

To a glass reactor of 3 l of capacity, kept at the controlled temperature of 25° C., 84 g of bisphenol A, 590 mg of 2,3,4,5-tetrachlorocarbonyl-tetrahydrofuran (branching agent, equivalent to 0.50% by mol, relatively to bisphenol), 65.2 g of sodium hydroxide dissolved in 650 ml of water, 20 mg of sodium dithionite (as a reducing agent) and 6.3 ml of an 0.5N aqueous solution of triethylamine are charged under nitrogen.

Then, 2.7 g of p-tert.butyl-phenol dissolved in 1,300 ml of methylene chloride is added, and through the mixture 44 g of phosgene gas is bubbled, within a 30-minute time, with vigorous stirring.

The reaction is continued for 2 hours, with aqueous sodium hydroxide (at 20% by weight) being added for the purpose of maintaining a pH value higher than 11.

At the end, the reaction mixture is diluted with 500 ml of methylene chloride, and the organic phase is separated and successively washed with 300 ml of water (twice), 800 ml of 0.15N aqueous sodium hydroxide (three times), 600 ml of water (twice), 800 ml of 0.1N hydrochloric acid and, finally, with portions of 600 ml of water until neutrality.

At the end, the polymer is recovered by distilling off the organic solvent, is dried and ground until a powder is obtained.

The branched polycarbonate displays the following characteristics:
Intrinsic Viscosity=0.598 dl/g;
Shear Sensitivity=19.7;
IZOD Impact Resistance=784 j/m.

EXAMPLE 3

An amount of 243 g of chloroformyl-capped polycarbonate oligomers (number average molecular weight=826, chloroformyl end groups=2,300 meq/kg; hydroxy end groups=121 meq/kg), prepared from bisphenol A, phosgene and p-tert.butyl-phenol and dissolved in 850 ml of methylene chloride, is charged, under nitrogen, to a glass reactor of 2.5 l of capacity, kept at the controlled temperature of 25° C.

With the above solution being kept mechanically stirred, by means of a magnetic-anchor stirrer (300 rpm), to it 50 ml of methylene chloride containing 1.30 g of 2,3,4,5-tetrachlorocarbonyl-tetrahydrofuran (branching agent, equivalent to 0.34% by mol relatively to total bisphenol A), and 50 ml of water containing 1.0 g of sodium hydroxide, 31 mg of sodium dithionite and 5 ml of an 0.05N aqueous solution of triethylamine are added in the order shown.

Forty minutes later, 300 ml of water is added, containing 51.5 g of bisphenol A and 19 g of sodium hydroxide and, then, 92 ml of an aqueous solution of sodium hydroxide at 20% (by weight) is charged over a 10-minute time, by using a metering pump.

After 3 hours, the mixture is poured into 2,200 ml of methylene chloride; the organic phase is subsequently separated and washed, in the order, with 450 ml of water (twice), 1,300 ml of 0.15N aqueous sodium hydroxide (3 times), 900 ml of water (twice), 1,300 ml of 0.1N hydrochloric acid, and, finally, with portions of 900 ml of water, until neutrality.

The branched polycarbonate, isolated by means of the usual methodology, shows the following characteristics:
Intrinsic Viscosity=0.578 dl/g;
Shear Sensitivity=16.6;
IZOD Impact Resistance=761 j/m.

EXAMPLE 4

The process is carried out by the same operative modalities and amounts of reactants as of Example 3, except that 2.45 g of of 2,3,4,5-tetrachlorocarbonyltetrahydrofuran (0.65% by mol relatively to total bisphenol A) is added.

The branched polycarbonate obtained has the following characteristics:
Intrinsic Viscosity=0.609 dl/g;
Shear Sensitivity=21.6;
IZOD Impact Resistance=782 j/m.

I claim:

1. Thermoplastic, blow moldable, branched polycarbonate derived from at least one aromatic dihydroxy compound, phosgene, and aliphatic polyfunctional acid branching agent compound having the formula:

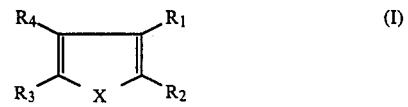

wherein
$R_1$, $R_2$, $R_3$ and $R_4$ are the same or different from each other, and represent —COOH or COCL;
X is O or S or the corresponding saturated compounds.

2. Branched polycarbonate according to claim 1, wherein the aliphatic polyfunctional acid branching agent compound of formula (I), is selected from:
2,3,4,5-furan-tetracarboxylic acid;
2,3,4,5-thiophene-tetracarboxylic acid;
2,3,4,5-tetrachlorocarbonylfuran;
2,3,4,5-tetrahydrofuran-tetracarboxylic acid; or
2,3,4,5-tetrachlorocarbonyl-tetrahydrofuran.

3. Branched polycarbonate according to claim 1, wherein the amount of aliphatic polyfunctional acid branching agent compound of formula (I) is from 0.05 to 5 mol per each 100 mol of aromatic dihydroxy-compound.

4. Process for the preparation of thermoplastic, blow moldable, branched polycarbonate derived from at least one aromatic dihydroxy compound, phosgene, and aliphatic polyfunctional acid branching agent compound having the formula:

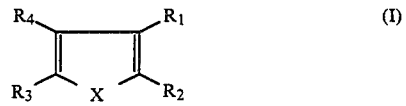

wherein
$R_1$, $R_2$, $R_3$ and $R_4$ are the same or different from each other, and represent —COOH or COCL; X is O or S or the corresponding saturated compounds, comprising the following steps carried out successively:
(a) preparing a chloroformyl-capped oligomer, by reacting phosgene and a dihydroxyaromatic compound, corresponding to the formula:

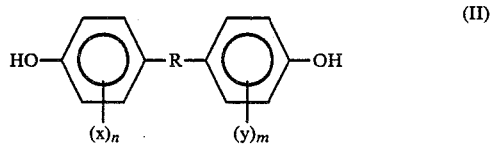

wherein:
R represents substituted or unsubstituted alkylene radical, containing from 0 to 5 carbon atoms, —O— or —S— atoms, —SO$_2$— or —CO— groups;
x, y are the same or different from each other, and represent H, CH$_3$, halogens;
m and n are integers, the same or different from each other, within the range of from 1 to 4;
(b) condensing the so-obtained oligomer with said aliphatic polyfunctional acid branching agent compound of formula (I), wherein $R_1$, $R_2$, $R_3$, and $R_4$, X have the above meaning;
(c) adding a dihydroxyaromatic compound (II) to the mixture resulting from (b) and polycondensing said mixture; and
(d) recovering the branched polycarbonate from the reaction mixture.

5. Process according to claim 4 for preparation of the branched polycarbonate wherein said aliphatic polyfunctional acid branching agent compound of formula (I) is selected from:
2,3,4,5-furan-tetracarboxylic acid;
2,3,4,5-thiophene-tetracarboxylic acid;
2,3,4,5-tetrachlorocarbonylfuran;
2,3,4,5-tetrahydrofuran-tetracarboxylic acid; or
2,3,4,5-tetrachlorocarbonyl-tetrahydrofuran.

6. Process according to claim 4 for preparation of branched polycarbonate wherein the amount of the tetrafunctional heterocyclic compound, (I), is from 0.05 to 5 mol per each 100 mol of aromatic dihydroxy-compound.

7. Process according to claim 4, characterized in that in the (a) and (c) process steps, the dihydroxyaromatic compound is selected from:
4,4'-dihydroxydiphenyl;
2,2-bis(4-hydroxyphenyl)propane;
2,2-bis(3,5-dichloro-4-hydroxyphenyl)propane;
2,2-bis(3,5-dimethyl-4-hydroxyphenyl)propane; or
bis-(4-hydroxyphenyl)methane.

8. Process according to claim 4, characterized in that in the (a) and (c) process steps, the dihydroxyaromatic compound is selected from:
4,4'-dihydroxydiphenyl;
2,2-bis(4-hydroxyphenyl)propane;
2,2-bis(3,5-dichloro-4-hydroxyphenyl)propane;
2,2-bis(3,5-dimethyl-4-hydroxyphenyl)propane; or
bis-(4-hydroxyphenyl)methane.

9. Process according to claim 6 characterized in that in the (a) and (c) process steps, the dihydroxyaromatic compound is selected from:
4,4'-dihydroxydiphenyl;
2,2-bis(4-hydroxyphenyl)propane;
2,2-bis(3,5-dichloro-4-hydroxyphenyl)propane;
2,2-bis(3,5-dimethyl-4-hydroxyphenyl)propane; or
bis-(4-hydroxyphenyl)methane.

10. Process according to claim 4, characterized in that in the (a) process step, the reaction is carried out in a water/organic solvent two phase system, in the presence of a molecular weight control agent, constituted by a monofunctional phenol, and that the oligomers obtained have a molecular weight of from 400 to 2,000.

11. Process according to claim 5, characterized in that in the (a) process step, the reaction is carried out in a water/organic solvent two phase system, in the presence of a molecular weight control agent, constituted by a monofunctional phenol, and that the oligomers obtained have a molecular weight of from 400 to 2,000.

12. Process according to claim 6, characterized in that in the (a) process step, the reaction is carried out in a water/organic solvent two phase system, in the presence of a molecular weight control agent, constituted by a monofunctional phenol, and that the oligomers obtained have a molecular weight of from 400 to 2,000.

13. Process according to claim 10, characterized in that in the (a) process step, the organic solvent is methylene chloride and the monofunctional phenol is selected from:
phenol;
p-isopropyl-phenol; or
p-tert-butyl-phenol.

14. Process according to claim 11, characterized in that in the (a) process step, the organic solvent is methylene chloride and the monofunctional phenol is selected from:
phenol;
p-isopropyl-phenol; or
p-tert-butyl-phenol.

15. Process according to claim 12, characterized in that in the (a) process step, the organic solvent is methylene chloride and the monofunctional phenol is selected from:
phenol;
p-isopropyl-phenol; or
p-tert-butyl-phenol.

16. Process according to claim 4, 5 or 6, characterized in that in the (b) step the process is carried out in a water/organic solvent two phase system, in the presence of a phase transfer catalyst, and that said aliphatic polyfunctional acid branching agent compound of formula I is selected from:
2,3,4,5-furan-tetracarboxylic acid;
2,3,4,5-thiophene-tetracarboxylic acid;
2,3,4,5-tetrachlorocarbonylfuran;
2,3,4,5-tetrahydrofuran-tetracarboxylic acid; or
2,3,4,5-tetrachlorocarbonyl-tetrahydrofuran.

17. Process according to claim 16, characterized in that in the (b) process step, the organic solvent is methylene chloride and the catalyst is a tertiary amine.

* * * * *